(12) United States Patent
Yoshida et al.

(10) Patent No.: US 7,025,685 B2
(45) Date of Patent: Apr. 11, 2006

(54) CONSTANT VELOCITY UNIVERSAL JOINT AND WHEEL BEARING DEVICE USING THE SAME

(75) Inventors: Kazuhiko Yoshida, Iwata (JP); Kazuhiro Muramatsu, Iwata (JP)

(73) Assignee: NTN Corporation, Osaka-Fu (JP)

( * ) Notice: Subject to any disclaimer, the term of this patent is extended or adjusted under 35 U.S.C. 154(b) by 0 days.

(21) Appl. No.: 10/635,413

(22) Filed: Aug. 5, 2003

(65) Prior Publication Data

US 2004/0058737 A1  Mar. 25, 2004

(30) Foreign Application Priority Data

Aug. 12, 2002 (JP) ............... 2002-234745

(51) Int. Cl.
*F16D 3/223* (2006.01)
(52) U.S. Cl. .................. 464/145; 464/906; 72/714
(58) Field of Classification Search ............... 464/145, 464/146, 178, 906, 111, 905, 140–144; 384/544; 72/714
See application file for complete search history.

(56) References Cited

U.S. PATENT DOCUMENTS

| | | | |
|---|---|---|---|
| 4,279,528 A | 7/1981 | Mangiavacchi et al. ...... 403/57 |
| 4,698,047 A * | 10/1987 | Welschof et al. ........... 464/145 |
| 5,725,285 A * | 3/1998 | Niebling et al. ........ 384/544 X |
| 5,803,993 A * | 9/1998 | Yoshida et al. | |
| 5,913,633 A * | 6/1999 | Shimizu et al. | |
| 6,319,337 B1 * | 11/2001 | Yoshida et al. | |
| 6,390,924 B1 * | 5/2002 | Yoshida et al. ............. 464/111 |
| 6,634,951 B1 * | 10/2003 | Sahashi et al. ............. 464/145 |
| 2002/0072421 A1 * | 6/2002 | Ouchi ........................ 464/178 |

FOREIGN PATENT DOCUMENTS

| | | |
|---|---|---|
| DE | 199 63 653 | 7/2001 |
| JP | 55-164032 | 12/1980 |
| JP | 5-9583 | 1/1993 |
| WO | WO 02/16156 | 2/2002 |

OTHER PUBLICATIONS

SAE Universal Joint and Driveshaft Design Manual, AE-7, Society of Automotive Engineers, Inc., Warrendale, PA, pp. 145 & 149, TJ1079.S62 1979.*

* cited by examiner

*Primary Examiner*—Greg Binda
(74) *Attorney, Agent, or Firm*—J.C. Patents

(57) ABSTRACT

A constant velocity universal joint which can provide an improved strength in a stem portion by simple and effective countermeasure. The constant velocity universal joint include a bowl-shaped mouth portion and an outer joint member having the stem portion with a serration formed on its outer peripheral surface. The stem portion extends from a bottom portion of the mouth portion in its axial direction as an integrated part. An induction hardened area C is formed in the bottom portion of the mouth portion.

11 Claims, 6 Drawing Sheets

| | Static torsion strength | Surface hardness (Hv)/Hardness effective depth (mm) | | |
|---|---|---|---|---|
| | | Base portion | Unhardened portion | Mouth bottom portion |
| Conventional product | Reference | 672/1.8 | 230 | — |
| Example a | ○ | 670/1.8 | 230 | 703/0.8 |
| Example b | ◎ | 670/1.8 | 230 | 703/1.3 |
| Example c | ◎ | 670/1.9 | 230 | 703/2.6 |
| Example d | ○ | 668/1.8 | 230 | 703/3.9 |
| Example e | × | 595/1.0 | 230 | 701/4.5 |

Cross: Crack occurred.Lower than conventional one.
Circle: Better than conventional one.
Double circle: Far better than conventional one.

FIG. 3

| Heating time | Ratio of step: m/n=1.5 | | Ratio of step: m/n=1.8 | | Ratio of step: m/n=2.0 | |
|---|---|---|---|---|---|---|
| | Hardness/depth Hv/mm | Rate of crack occurrence at shoulder portion(%) | Hardness/depth Hv/mm | Rate of crack occurrence at shoulder portion(%) | Hardness/depth Hv/mm | Rate of crack occurrence at shoulder portion(%) |
| Short | 665/2.5 | 0% | 665/2.4 | 0% | 665/2.4 | 0% |
| ↓ | 671/2.9 | 0% | 671/2.9 | 0% | 671/2.8 | 0% |
| | 662/3.0 | 0% | 662/3.2 | 0% | 662/3.0 | 0% |
| | 660/3.5 | 0% | 660/3.6 | 0% | 660/3.1 | 61% |
| Long | 660/4.2 | 0% | 660/3.9 | 12% | 660/3.1 | 88% |

FIG. 4

CONSTANT VELOCITY UNIVERSAL JOINT AND WHEEL BEARING DEVICE USING THE SAME

BACKGROUND OF THE INVENTION

1. Field of the Invention

The present invention relates to a constant velocity universal joint for use in a power transmission system of a vehicle, various industrial machines, and the like, and also to a wheel bearing device for rotatably supporting a driving wheel to a vehicle body using the same.

2. Description of the Related Art

A wheel beating device of a vehicle, as shown in FIG. 6 as an example, includes a wheel hub 1, a double-row bearing 2, and a constant velocity universal joint 3b, as essential components. In the bearing device, the constant velocity universal joint 3b is press-fitted into an inner periphery of the wheel hub 1 in order to allow torque transmission. FIG. 5 shows an outer joint member 12 that constitutes a conventional constant velocity universal joint 3b assembled in the wheel bearing device In FIG. 6. Components for the wheel bearing device having the following constructions.

The wheel hub 1 has an outboard side inner race 4 formed on its outer peripheral surface, and a flange 6 for attachment of a wheel (not shown). Hub bolts 7 for fixing a wheel disc are inserted at equal intervals in a circumferential direction of the flange 6. An inner ring 9 is fitted onto a smaller diameter stepped portion 8 of the outer peripheral surface of the wheel hub 1 on the inboard side end. An inboard side inner race 5 is formed on the outer peripheral surface of the inner ring 9. A serration 10 is formed on the inner peripheral surface of the through hole of the wheel hub 1.

To prevent a creep, the inner ring 9 is press-fitted with an adequate amount of interference. The outboard side inner race 4 formed on the outer peripheral surface of the wheel hub 1 and the inboard side inner race 5 formed on the outer peripheral surface of the inner ring 9 are used as double-row inner races. The inner ring 9 is press-fitted onto the smaller diameter stepped portion 8 of the wheel hub 1, and an outer joint member 12 of the constant velocity universal joint 3, inserted from the inboard side of the wheel hub 1 in the axial direction, is then fastened onto the wheel hub 1 to mate the end portion of the inner ring 9 with the shoulder portion 13a of the outer joint member 12 so as to prevent the inner ring 9 from coming off and to perform a pre-load control.

An outer ring 14 has outer races 15 and 16 on its inner peripheral surface, to face the inner races 4 and 5 of the wheel hub 1 and the inner ring 9, respectively, and a flange 17 for attachment onto a vehicle body (not shown). This flange 17 is fixed to the knuckle (not shown) extended from a suspension apparatus of the vehicle with bolts.

The bearing 2 is a double-row angular contact ball bearing, and has rollers 18 interposed between the inner races 4 and 5, and the outer races 15 and 16. The inner races 4 and 5 are formed on the outer peripheral surfaces of the wheel hub 1 and the inner ring 9, respectively. The outer races 15 and 16 are formed on the inner peripheral surface of the outer ring 14. The rollers 18 in the respective rows are held with a cage (not shown) at equal intervals in a circumferential direction. A pair of seals 19 and 20 are fitted to the inner periphery of the outer ring 14 at both open ends of the bearing 2 to seal an annular space between the outer ring 14, and the wheel hub 1 and the inner ring 9 to prevent grease filling inside the bearing from leaking and to prevent intrusion of water and foreign matters from outside.

The constant velocity universal joint 3 includes an outer joint member 12 having a track groove 21 formed on an inner peripheral surface, an inner joint member 23 having a track groove 22 formed on an outer peripheral surface opposing to the track groove 21 on the outer joint member 12, balls 24 interposed between the track groove 21 on the outer joint member 12 and the track groove 22 on the inner joint member 23, and a cage 25 retaining balls 24 between the outer joint member 12 and the inner joint member 23.

The outer joint member 12 includes a bowl-shaped mouth portion 26a accommodating the inner joint member 23, the balls 24 and the cage 25, and a stem portion 27 integrally formed with and extending from the mouth portion 26a in an axial direction with a serration 11 formed on its outer peripheral surface. To fix the constant velocity universal joint 3 to the wheel hub 1, the stem portion 27 is inserted into the through hole of the wheel hub 1, so that the outer peripheral surface of the stem portion 27 and the inner peripheral surface of the through hole are mated with the serrations 11 and 10 which are formed thereon, respectively, and a nut 29 is set to the thread portion 28 formed in the shaft end portion and tightened. A pre-load is controlled by applying an axial force produced by tightening the nut 29.

As shown in FIG. 5, the outer joint member 12, which is a part of the above-mentioned constant velocity universal joint 3, includes the mouth portion 26a and the stem portion 27. The mouth portion 26a has the plurality of track grooves 21 formed on its inner peripheral surface, and a shoulder portion 13a formed on the outer peripheral surface corresponding to its bottom portion. The stem portion 27 has a back face 30, which is an end face of the shoulder portion of the mouth portion 26a, to be abutted to an end portion of the inner ring 9, a thread portion 28 and the serration 11 that enables torque transmission between the wheel hub 1 and the stem portion 27. The stem portion 27 is fixed to the wheel hub 1 by tightening the nut 29 on the thread portion 28, thereby mating the serration 11 with the wheel hub 1 to transmit the torque.

Accordingly, a base portion 31 of the stem potion 27 is subjected to a tensile stress caused by tightening the nut 29 to the tread portion 28, a shearing stress caused by the torque transmission through the serration 11, and a bending stress by the wheel hub 1 to which the wheel is mounted. Since the base portion 31 of the stem portion 27 must have a strength enough to endure this compound stress, the base portion 31 is designed to have enough wall thickness in the back face 30 and is subjected to surface hardening treatment.

However, an increase in the wall thickness in the back face 30 can lead to increase in the weight of the constant velocity universal joint 3b, which is not preferable. Sine it also locates the center of the outer joint member 12 as near as possible to the center of king pin, restriction is imposed on the design of the base portion 31 of the stem portion 27 so as to select only the shape to be continued from the serration 11 to the back face 30 through a chamfer. This design limitation will cause stress concentration both at the serration 11 and at the base portion due to the chamfer shape, to decrease the strength. One possible countermeasure against this problem is to make an outside diameter of the base portion 31 of the stem portion 27 larger. However, this countermeasure cannot be regarded as good means because it requires a drastic change in design of the vehicle wheel portions.

In general, a region ranging from the serration 11 of the stem portion 27 to the shoulder portion 13a of the mouth portion 26a through the back face 30 of the base portion 31 (induction hardened area A) and a track region which is an inner peripheral surface where the track groove 21 of the mouth portion 26a is formed (induction hardened area B) are subjected to surface hardening treatment by induction hardening. The wall of the back face 30 is designed to be thinner because the base portion 31 of the stem portion 27 is subjected to induction hardening. However, since the base portion 31 is chamfered, the depth of the hardened portion becomes shallow in the base portion 31. This depth becomes shallower more significantly when the outside diameter of the shoulder portion 13a is equal to or more than twice of the outside diameter of the serration in the stem portion 27.

This is because the base portion 31 is difficult to be hardened for fear of a quench crack and a fusion at the corner portion 32. The quench crack and the fusion may occur when the serration 11 of the stem portion 27, the back face 30 of the base portion 31 and the shoulder portion 13a of the mouth portion 26a are subjected to induction hardening at the same time because it is difficult to concentrate the heat at the base portion 31 of the stem portion 27, while it is easy to concentrate the heat at the corner portion 32 between the back face 30 and the corner portion 13a. The quench crack is easier to occur in induction hardening than in other heat treatments, because heating up time to a high temperature (900 to 1000.degree. C.) is so short as a few seconds and so is a cooling time.

A possible countermeasure against this problem is to use a ferrite core and the like for the base portion 31 of the stem portion 27 to facilitate a heat concentration at the base portion 31 during induction hardening. However, in practice, it is difficult to attain a good heat concentration at the base portion 31. Another possible countermeasure is to chamfer the shoulder portion 13a of the mouth portion 26a to an obtuse angle. However, this may significantly deteriorate sealing performance.

Another possible countermeasure to improve the strength of the base portion 31 of the stem portion 26a is to change the material of the outer joint member 12 to alloy steel. However, this cannot be an effective countermeasure because it substantially deteriorates forgeability. Another possible countermeasure is to improve fatigue strength by shot peening. However, this hardly improves a static strength and impact strength.

Prevention of quench crack at the corner portion 32 between the back face 30 and the shoulder portion 13a requires so many quality control items including check of clearance between an induction heating coil and the outer joint member 12, heat control during heating the coil, frequency optimization, coolant concentration control, cooling start time optimization, and Jominy value control for a material, that they actually cause a low yield rate and a high cost.

BRIEF SUMMARY OF THE INVENTION

The present invention is devised to solve the above-mentioned problems, and an object of the invention is to provide a constant velocity universal joint that can improve the strength of the base portion of the stem portion with simple and effective means.

As technical means to achieve the above-mentioned object, a constant velocity universal joint according to the present invention is provided with an outer joint member including a bowl-shaped mouth portion and a stem portion with a serration formed on an outer peripheral surface thereof, the stem portion extending from a bottom portion of the mouth portion in an axial direction. The constant velocity universal joint is characterized in that an induction hardened area is formed in the bottom portion of the mouth portion of the outer joint member. The item herein called as a serration includes a spline. The above-mentioned mouth portion and the stem portion can be either one integrated part or respective separate parts.

In general, the serration of the stem portion, a back face of a base portion and a shoulder portion of the mouth portion are subjected to induction hardening in the outer joint member of the constant velocity universal joint. However, according to the present invention, the bottom portion of the mouth portion is locally subjected to induction hardening to harden its surface. This induction hardening to the bottom portion of the mouth portion enhances the strength of the base portion of the stem portion whose surface has been hardened by induction hardening.

In the above-mentioned constant velocity universal joint, an induction hardened area is formed in the base portion of the stem portion, and an unhardened area may preferably be remained between the induction hardened area in the base portion of the stem portion and that in the bottom portion of the mouth portion. Because, without this unhardened area between the induction hardened area in the base portion of the stem portion and that in the bottom portion of the mouth portion, the entire area rank from the base portion of the stem portion to the bottom portion of the mouth portion is hardened improvement in fatigue strength becomes difficult, and impact resistance drops significantly.

In the constant velocity universal joint of the present invention, the induction hardened area in the base portion of the stem portion may preferably be formed after the formation of the induction hardened area in the bottom portion of the mouth portion. If the bottom portion of the mouth portion is subjected to induction hardening after the base portion of the stem portion is induction-hardened, the surface of the bottom portion may be softened during heating. Since the base portion of the stem portion is subjected to induction hardening after the bottom portion of the mouth portion is induction-hardened, the bottom portion surface of the mouth portion is prevented from being softened due to the shape designed to have difficulty in induction hardening resulting in its shallower hardened depth. This facilitates the formation of the unhardened area between the base portion of the stem portion and the bottom portion of the mouth portion.

A constant velocity universal joint according to another aspect of the present invention is provided with an outer joint member including a bowl-shaped mouth portion and a stem portion with a serration formed on an outer peripheral surface thereof, the stem portion extending from a bottom portion of the mouth portion in an axial direction. In the universal joint, an outside diameter of a shoulder portion formed on an outer periphery of the bottom portion of the mouth portion is equal to or greater than twice of an outside diameter of the serration of the stem portion. The constant velocity universal joint is characterized in that a depth of an induction hardened area in a base portion of the stem portion is set to 3 mm or less.

When implementing induction hardening to constant velocity universal joints whose outside diameter of the shoulder portion is equal to or larger than twice of the outside diameter of the serration of the stem portion, heat is heavily concentrated at the corner portion between the base portion and the shoulder portion of the mouth portion. However, quench crack can be prevented from occurring in the corner portion located between the base portion and the shoulder portion of the mouth portion by keeping a depth of the induction hardened area to be 3 mm or less. If the outside diameter of the shoulder portion is smaller than the twice of the outside diameter of the serration of the stem portion, the problem will not occur without any heavy heat concentration at the corner portion between the base portion and the shoulder portion of the mouth portion. If the depth of the induction hardened area in the base portion exceeds 3 mm, the corner portion between the base portion and the shoulder portion is overheated to cause a quench crack during cooling with water.

In the constant velocity universal joint of the present invention, the induction hardened area in the bottom portion of the mouth portion can be formed at the same time when the induction hardened area is formed in the track portion formed on the inner peripheral surface of the outer joint member.

The constant velocity universal joint of the present invention can be applied to a wheel bearing device which includes an outer member having double rows of outer races on its inner periphery, an inner member having double rows of inner races to face the outer races, respectively, and double rows of rollers incorporated in between the races of the outer member and the inner member, and has a constant velocity universal joint inserted into and fitted with the inner member via the serration.

BRIEF DESCRIPTION OF THE DRAWINGS

FIG. 3 is a table showing results of a comparison test between a conventional product without induction hardened bottom portion of the mouth portion and the products of the present invention with induction hardened bottom portion.

FIG. 4 is a table showing results of examination on occurrence of quench crack in the corner portion between the back face and the shoulder portion in relation to various depths of hardened portion in the base portion.

DETAILED DESCRIPTION OF THE INVENTION

Figure 1:
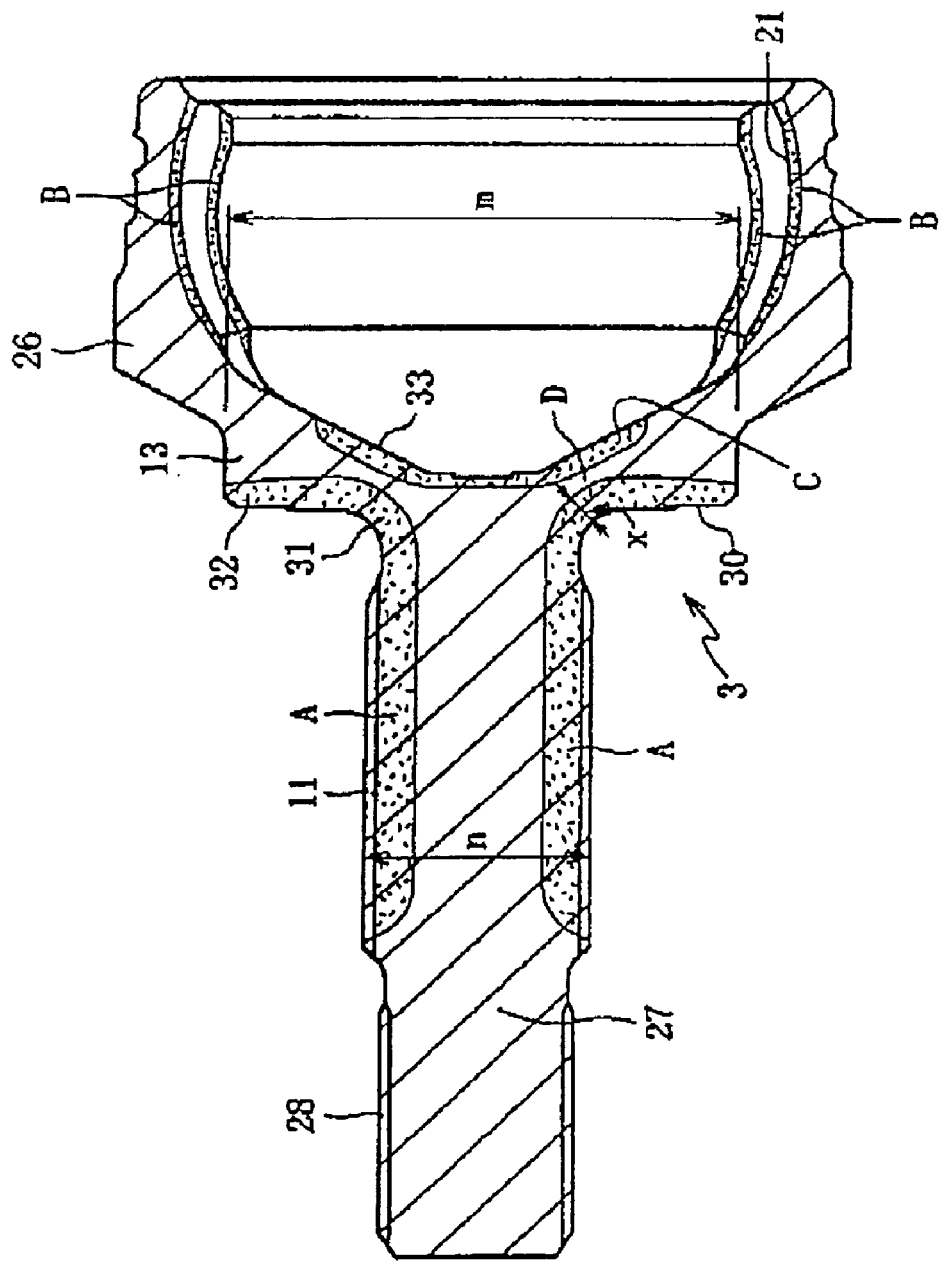
FIG. 1 is a cross sectional view showing a constant velocity universal joint according one embodiment of the present invention.
Figure 2:
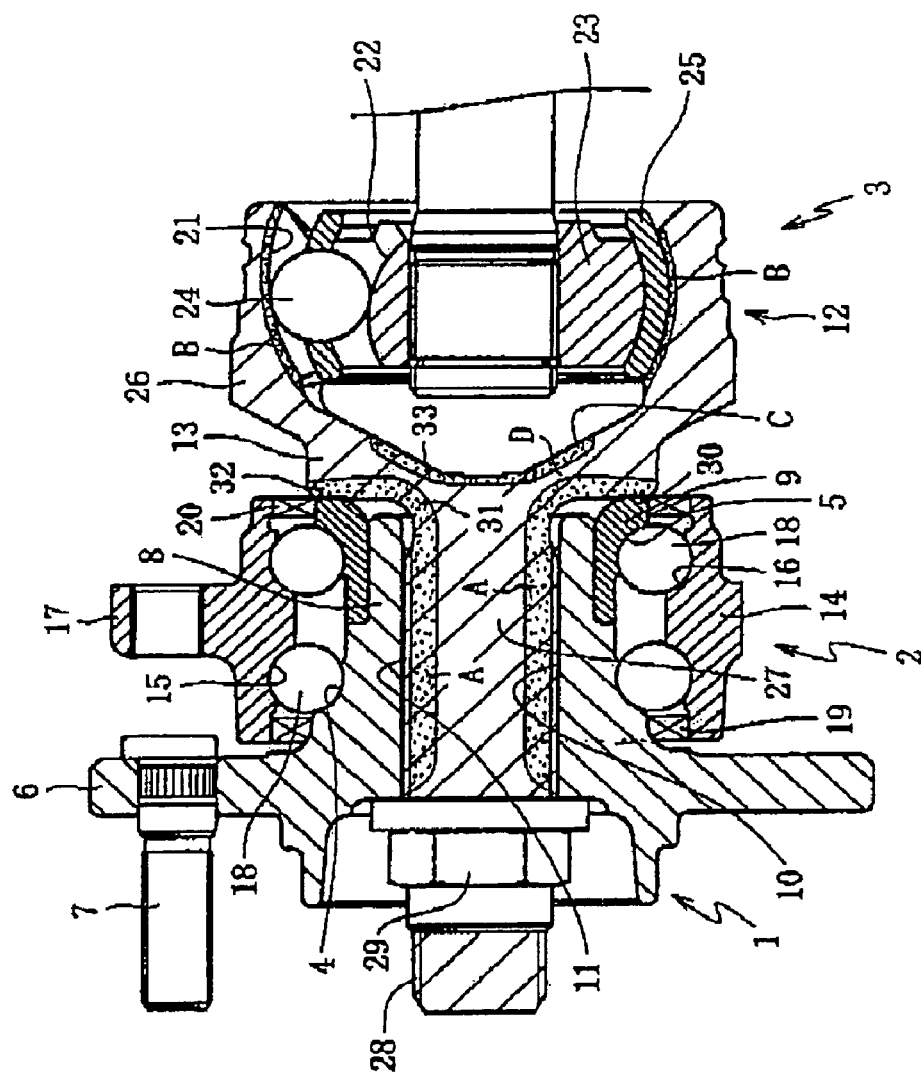
FIG. 2 is a cross sectional view of a wheel bearing apparatus with the constant velocity universal joint of FIG. 1 assembled therein.
Figure 5:
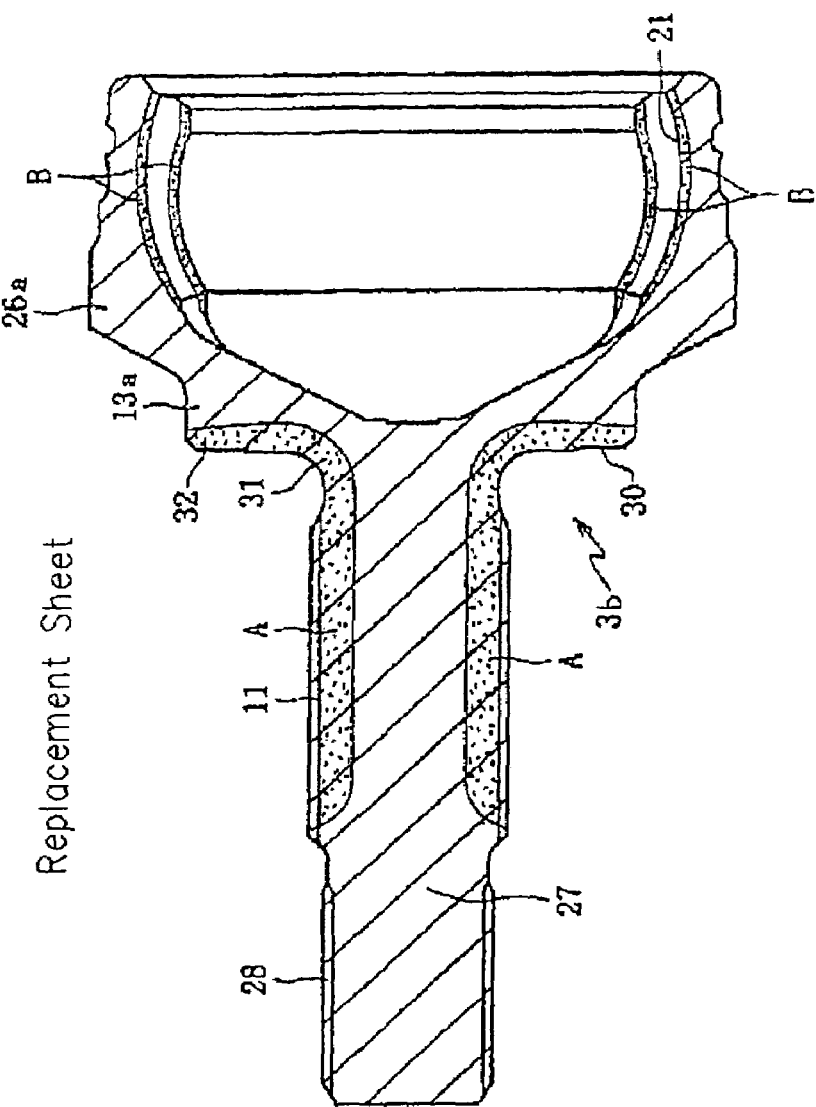
FIG. 5 is a cross sectional view showing a conventional constant velocity universal joint.
Figure 6:
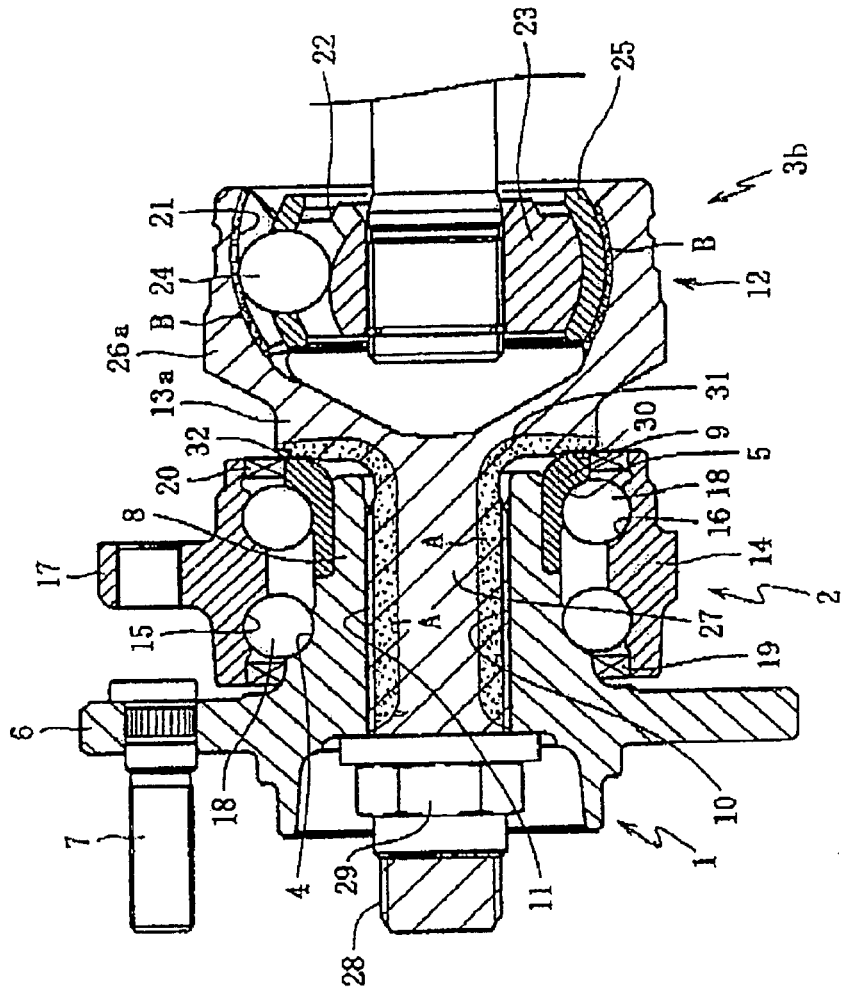
FIG. 6 is a cross sectional view of a wheel bearing device with the constant velocity universal joint of FIG. 5 assembled therein.

FIG. 1 shows one embodiment of a constant velocity universal joint according to the present invention, which particularly illustrates an outer joint member constituting the constant velocity universal joint. FIG. 2 shows an example of a structure of a wheel bearing apparatus with the constant velocity universal joint of this embodiment incorporated therein. The sam reference numerals are applied to the same or substantially same components as in FIGS. 5 and 6. The wheel bearing apparatus includes, as essential components, a wheel hub 1, a double-row bearing 2, and a constant velocity universal joint 3. The constant velocity universal joint 3 is press-fitted into an inner periphery of the wheel hub 1 in order to allow torque transmission.

The wheel hub 1 has an outboard side inner race 4 on its outer peripheral surface and a flange 6 for attachment of a wheel (not shown). Hub bolts 7 for fixing a wheel disc are inserted at equal intervals in a circumferential direction of the flange 6. An inner ring 9 is fitted onto a smaller diameter stepped portion 8 formed on the outer peripheral surface of the wheel hub 1 on the inboard side end. An inboard side inner race 5 is formed on the outer peripheral surface of the inner ring 9. A serration 10 is formed on the inner peripheral surface of the through hole of the wheel hub 1.

To prevent a creep, the inner ring 9 is press-fitted with an adequate amount of interference. The outboard side inner race 4 formed on the outer peripheral surface of the wheel hub 1 and the inboard side inner race 5 formed on the outer peripheral surface of the inner ring 9 are used as double-row inner races. The inner ring 9 is press-fitted onto the smaller diameter stepped portion 8 of the wheel hub 1, and an outer joint member 12 of the constant velocity universal joint 3, inserted from the inboard side of the wheel hub 1 in the axial direction, is then fastened onto the wheel hub 1 to mate the end portion of the inner ring 9 with the shoulder portion 13 of the outer joint member 12 so as to prevent the inner ring 9 from coming off and to perform a pre-load control.

An outer ring 14 has outer races 15 and 16 on its inner peripheral surface, to face the inner races 4 and 5 of the wheel hub 1 and the inner ring 9, respectively, and a flange 17 for attachment onto a vehicle body (not shown). This flange 17 is fixed to the knuckle (not shown) extended from a suspension apparatus of the vehicle with bolts.

The bearing 2 is a double-row angular contact ball bearing, and has rollers 18 interposed between the inner races 4 and 5, and the outer races 15 and 16. The inner races 4 and 5 are formed on the outer peripheral surfaces of the wheel hub 1 and the inner ring 9, respectively. The outer races 15 and 16 are formed on the inner peripheral surface of the outer ring 14. The rollers 18 in the respective rows are held with a cage (not shown) at equal intervals in a circumferential direction. A pair of seals 19 and 20 are fitted to the inner periphery of the outer ring 14 at both open ends of the bearing 2 to seal an annular space between the outer ring 14, and the wheel hub 1 and the inner ring 9 to prevent grease filling inside the bearing from leaking and to prevent intrusion of water and foreign matters from outside.

The constant velocity universal joint 3 includes an outer joint member 12, an inner joint member 23, balls 24, and a cage 25. The outer joint member 12 has a track groove 21 formed on an inner peripheral surface thereof. The inner joint member 23 has a track groove 22 formed on an outer peripheral surface thereof opposing to the track groove 21 on the outer joint member 12. The balls 24 are interposed between the track groove 21 on the outer joint member 12 and the track groove 22 on the inner joint member 23. The cage 25 retains balls 24 between the outer joint member 12 and the inner joint member 23.

The outer joint member 12 includes a bowl-shaped mouth portion 26 accommodating the inner joint member 23, the balls 24, and the cage 25, and a stem portion 27 integrally formed with and extending from the mouth portion 26 in an axial direction. A serration 11 is formed on its outer peripheral surface. The stem portion 27 is inserted into the through hole of the wheel hub 1, so that the outer peripheral surface of the stem portion 27 and the inner peripheral surface of the through hole are mated with the serrations 11 and 10 which are formed thereon, respectively. Then, a nut 29 is set to the thread portion 28 formed in the shaft end portion and tightened to fix the constant velocity universal joint 3 to the wheel hub 1. A pre-load is controlled by an axial force by tightening the nut 29.

As shown in FIG. 1, the outer joint member 12 includes: the mouth portion 26 having the plurality of track grooves 21 formed on its inner peripheral surface, and a shoulder portion 13 formed on the outer peripheral surface corresponding to its bottom portion; and the stem portion 27 having a back face 30, which is an end fare of the shoulder portion of the mouth portion 26, to be abutted to an end portion of the inner ring 9, the serration 11 that enables torque transmission between the wheel hub 1 and the stem portion 27, and a thread portion 28. The stem portion 27 is fixed to the wheel hub 1 by tightening the nut 29 on the thread portion 28, thereby mating the serration 11 with the wheel hub 1 to transmit the torque.

Accordingly, a tensile stress due to the tightening force for the nut 29 on the thread portion 28, a shearing stress due to torque transmission through the serration 11, and a bending stress caused by the wheel hub 1 to which the wheel is mounted act on a base portion 31 of the stem portion 27. Since the base portion 31 of the stem portion 27 must have a strength enough to receive the above-mentioned compound stress, the base portion 31 is designed so as to secure an enough thickness in the back face 30 and to have a surface subjected to hardening treatment.

In general, the outer joint member 12 of the constant velocity 3 is subjected to induction hardening at a region ranging from the serration 11 of the stem portion 27 to the shoulder portion 13 of the mouth portion 26 through the back face 30 of the base portion 31 (induction hardened area A) and a track portion formed on the inner peripheral surface of the mouth portion 26 having the track groove 21 formed thereon (induction hardened area B).

In this embodiment, the bottom portion 33 of the mouth portion is locally subjected to induction hardening (induction hardened area C) to harden the surface thereof. This enhances the strength of the base portion 31 of the stem portion 27 whose surface is hardened by induction hardening. The induction hardened area C of the bottom portion 33 is not connected with the induction hardened area B in the track portion of the mouth portion 26, but is locally formed.

In the constant velocity universal joint 3, an unhardened area D is remained between the induction hardened area A formed in the base portion 31 of the stem portion 27 and the induction hardened area C formed in the bottom portion 33 of the mouth portion 26. If any unhardened area D between the induction hardened area A in the base portion 31 and the induction hardened area C in the mouth bottom portion 33 is not formed, all area ranging from the base portion 31 of the stem portion 27 to the bottom portion 33 of the mouth portion becomes hardened region to make it difficult to improve fatigue strength, thereby drastically deteriorating its impact resistance.

In this constant velocity universal joint 3, the induction hardened area A in the base portion 31 of the stem portion 27 is formed after the induction hardened area C in the bottom portion 33 of the mouth portion has been formed. If the bottom portion 33 of the mouth portion is subjected to induction hardening after conducting induction hardening to the base portion 31 of the stem portion 27, the surface of the bottom portion 33 may be softened during the heating of the bottom portion 33.

As a countermeasure, the base portion 31 of the stem portion 27 is subjected to induction hardening after conducting induction hardening to the bottom portion 33 of the mouth portion to prevent the surface of the bottom portion 33 from being softened owing to the shape of the base portion 31 that makes hardening difficult and a depth of the hardened portion shallow. This facilitates formation of the unhardened area D between the base portion 31 of the stem portion 27 and the bottom portion 33 of the mouth portion as described above.

The induction hardened area C of the bottom portion 33 can be formed at the same time when the induction hardened area B is formed in the track groove 21 formed on the inner peripheral surface of the outer joint member 12 by optimizing the shape of the heating coil for induction hardening. In this way, increase in the number of man-hour in the heat treatment process due to induction hardening can be restrained.

The induction hardened area C of the bottom portion 33 of the mouth portion must be formed in a range over the diameter of a cylindrical rupture formed in a static torsion test (described later), in which a crack is formed starting from the base portion 31 of the stem portion 27 towards the bottom portion 33 to generate a cylindrical rupture. If the hardening area in the bottom portion 33 is wider than necessary, a strain in the mouth portion 26 will increase. Accordingly, the hardened area significantly exceeding diameter of the cylindrical rupture is not preferable.

In the outer joint member 12 of this constant velocity universal joint 3, if the outside diameter m of the shoulder portion 13 formed on the outer periphery of the bottom portion 33 of the mouth portion equals to or exceeds twice of the outside diameter n of the serration in the stem portion 27, the depth x of the induction hardened area A of the base portion 31 of the stem portion 27 is set to be 3 mm or less. When the base portion 13 of the stem portion 27 is subjected to induction hardening for the outer joint member 12 having the shoulder portion 13 with the outside diameter m equal to or greater than the outside diameter n of the serration of the stem portion 27, the depth of the induction hardened area A is adjusted to be 3 mm or less. This can prevent quench crack occurrence in the corner portion 32 located between the back face 30 of the base portion 31 and the shoulder portion 13 of the mouth portion 26.

EXAMPLE 1

The applicant of the present invention conducted a comparison test on the conventional outer joint member 12 of the constant velocity universal joint 3 constituted as above and that according to the present invention. The conventional one includes the unhardened bottom portion 33 and that according to the invention includes the induction hardened bottom portion 33. In this comparison test, a carbon steel S53C was used as a material for the outer joint member 12. The material was forged, and machined to a predetermined shape, followed by induction hardening and grinding.

Conditions of the induction hardening are as follows:
Frequency of the oscillator: 10 kHz;
Input power: 330 kW;
Hating time: 3.2 to 4.2 seconds; and
Coolant: PAG synthetic (water soluble).

Specifications of serration are as follows:
Outer diameter: 23.284;
Inner diameter: 21.116;
Number of teeth: 21;
PCD: 22.225;
Pressure angle: 45°; and
Module: 1.058.

As shown in the test result of FIG. 3, the conventional one was subjected to induction hardening only to the serration 11 of the stem portion 27, the back face 30 of the base portion 31, the shoulder portion 13 of the mouth portion 26 (induction hardened area A) and the track portion (induction hardened area B). On the other hand, in the present invention, the bottom portion 33 of the mouth portion 26 (induction hardened area C) was subjected to induction hardening in addition to the serration 11 of the stem portion 27, the back face 30 of the base portion 31, and the shoulder portion 13 of the mouth portion 26 (induction hardened area A), and the track portion (induction hardened area B). Examples a to e show the test results for different depths of the hardened portions in the bottom portion 33. In Example e, the bottom portion 33 was subjected to hardened more to soften the base portion 31 of the stem portion 27 intentionally.

As seen from the test results, Examples a to d showed better results in comparison with the conventional one in respect of the static torsion strength. Especially, Examples b and c are far superior to the conventional one. In Example e in which the base portion 31 was softened, the static torsion strength dropped and crack occurred

EXAMPLE 2

The applicant prepared samples with 1.5, 1.8 and 2.0 ratios of step between the outside diameter m of the shoulder portion 13 and the outside diameter n of the serration in the stem portion 27 for the outer joint member 12 of the constant velocity universal joint 3 constituted as above. Occurrence of quench crack in the corner portion 32 between the back face 30 and the shoulder portion 13 was studied with these samples by changing the depth of the hardened base portion 31 (by changing the output of the induction hardening equipment). In this examination, a carbon steel S53C was used as a material for the outer joint member 12, and the material was forged and machined to a predetermined shape, followed by induction hardening and grinding.

Conditions of the induction hardening are as follows:
Frequency of the oscillator: 10 kHz;
Input power: 330 kW;
Hating time: 3.2 to 4.2 seconds; and
Coolant: PAG synthetic (water soluble).

Specifications of serration are as follows:
Outer diameter: 23.284;
Inner diameter; 21.116;
Number of teeth: 21;
PCD: 22.225;
Pressure angle: 45°; and
Module: 1.058.

As seen from the test results shown in FIG. 4, quench crack did not occur even when the depth of the hardened base portion 31 was 4 mm with 1.5 and 1.8 ratios of step between the outside diameter m of the shoulder portion 13 and the outside diameter n of the serration in the stem portion 27. However, with 2.0 ratio of step between the outside diameter m of the shoulder portion 13 and the outside diameter n of the serration in the stem portion 27, 61% quench crack occurred when the depth of the hardened base portion 31 was 3.1 mm. Accordingly, the upper limit of the depth was found to be 3.1 mm.

In the above embodiments, a constant velocity universal joint 3 used in a wheel bearing device constituted to have a construction shown in FIG. 2 was described. However, the present invention is not limited to this, and applicable to constant velocity universal joints assembled into other power transmission apparatus.

According to the present invention, by locally subjecting the mouth bottom portion to induction hardening, the induction hardened area in the bottom portion of the mouth portion enhances the strength of the base portion of the stem portion to secure enough strength for the base portion of the stem portion. As a result, the thickness of the back face in the base portion can be reduced to reduce a weight of the constant velocity universal joint.

When this constant velocity universal joint is applied to a wheel bearing device, it facilitates the design to locate the center of an outer joint member at the center of the king pin to drastically reduce the turning-radius, resulting in improvement in convenience. Design to locate the center of the outer joint member at the center of the king pin enhances the rigidity of vehicle wheel portions, and facilitates drastic reduction in vibration to improve a feeling of riding vehicle. In addition, as the center position of the outer joint member becomes closer to a wheel, the normal operating angl of the constant velocity universal joint is reduced to suppress heat generation leading to prolong the life of the constant velocity universal joint. The lower normal operating angle also reduces the vibration of the constant velocity universal joint to further improve the feeling of riding a vehicle.

According to the present invention, for a constant velocity universal joint whose outside diameter of the shoulder portion is equal to or greater than twice of the outside diameter of the serration in the stem portion, the depth of the induction hardened area in the base portion in the above-mentioned stem portion is set to be 3 mm or less. This prevents occurrence of quench crack in the corner between the base portion and the shoulder portion of the mouth portion to significantly improve product yield rate and quality, facilitating set-up time saving and abolition of 100% inspection.

What is claimed is:

1. A constant velocity universal joint comprising an outer joint member including a bowl-shaped mouth portion and a stem portion with a serration formed on an outer peripheral surface thereof, the stem portion extending from a bottom portion of the mouth portion in an axial direction, wherein an induction hardened area is formed locally in an area in the bottom portion of the mouth portion of said outer joint member, and is formed on a surface substantially perpendicular to the axial direction in which the stem portion extends, and wherein another induction hardened area is formed in a base portion of said stem portion, and an unhardened area remains sandwiched between the induction hardened area in said base portion of said stem portion and the induction hardened area in the bottom portion of said mouth portion.

2. A constant velocity universal joint according to claim 1, wherein the induction hardened area in the base portion of said stem portion is formed after the induction hardened area in the bottom portion of the mouth portion is formed.

3. A constant velocity universal joint according to claim 2, wherein the induction hardened area in the bottom portion of said mouth portion is formed at the same time when an induction hardened area in a track portion formed on an inner peripheral surface of the outer joint member is formed.

4. A wheel bearing device comprising:
a constant velocity universal joint according to claim 3;
an outer member having double rows of outer races on an inner periphery thereof;
an inner member having double rows of inner races to face said outer races, respectively; and
double rows of rollers incorporated in between the races of said outer member and said inner member, wherein the constant velocity universal joint is inserted into and fitted with said inner member via the serration.

5. A wheel bearing device comprising;
a constant velocity universal joint according to claim 2;
an outer member having double rows of outer races on an inner periphery thereof;

an inner member having double rows of inner races to face said outer races, respectively, and double rows of rollers incorporated in between the races of said outer member and said inner member, wherein the constant velocity universal joint is inserted into and fitted with said inner member via the serration.

6. A constant velocity universal joint according to claim 1, wherein the induction hardened area in the bottom portion of said mouth portion is formed at the same time when an induction hardened area in a track portion formed on an inner peripheral surface of the outer joint member is formed.

7. A wheel bearing device comprising:

a constant velocity universal joint according to claim 6;

an outer member having double rows of outer races on an inner periphery thereof;

an inner member having double rows of inner races to face said outer races, respectively; and double rows of rollers incorporated in between the races of said outer member and said inner member, wherein the constant velocity universal joint is inserted into and fitted with said inner member via the serration.

8. A wheel bearing device comprising:

a constant velocity universal joint according to claim 1;

an outer member having double rows of outer races on an inner periphery thereof;

an inner member having double rows of inner races to face said outer races, respectively; and double rows of rollers incorporated in between the races of said outer member and said inner member, wherein the constant velocity universal joint is inserted into and fitted with said inner member via the serration.

9. A constant velocity universal joint comprising an outer joint member including a bowl-shaped mouth portion and a stem portion with a serration formed on an outer peripheral surface thereof, the stem portion extending from a bottom portion of the mouth portion in an axial direction, an outside diameter of a shoulder portion formed on an outer periphery of the bottom portion of the mouth portion being equal to or greater than twice of an outside diameter of the serration of the stem portion, wherein an induction hardened area is formed locally in an area in the bottom portion of the mouth portion of said outer joint member, and is formed on a surface substantially perpendicular to the axial direction in which the stem portion extends, and a depth of an induction hardened area in a base portion of the stem portion is set to 3 mm or less.

10. A wheel bearing device comprising:

a constant velocity universal joint according to claim 9;

an outer member having double rows of outer raves on an inner periphery thereof;

an inner member having double rows of inner races to face said outer races, respectively; and double rows of rollers incorporated in between the races of said outer member and said inner member, wherein the constant velocity universal joint is inserted into and fitted with said inner member via the serration.

11. A constant velocity universal joint according to claim 9, wherein an unhardened area remains sandwiched between the induction hardened area in said base portion and that in the bottom portion of said mouth portion.

* * * * *